United States Patent
Geissler

(10) Patent No.: US 12,385,321 B2
(45) Date of Patent: Aug. 12, 2025

(54) DRILLING TURBINE AND METHOD OF DIRECTIONAL DRILLING

(71) Applicant: FRAUNHOFER-GESELLSCHAFT ZUR FÖRDERUNG DER ANGEWANDTEN FORSCHUNG E.V., Munich (DE)

(72) Inventor: Niklas Geissler, Bochum (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 90 days.

(21) Appl. No.: 18/050,857

(22) Filed: Oct. 28, 2022

(65) Prior Publication Data
US 2023/0107576 A1 Apr. 6, 2023

Related U.S. Application Data

(63) Continuation of application No. PCT/EP2021/061992, filed on May 6, 2021.

(30) Foreign Application Priority Data

May 7, 2020 (DE) .......................... 102020205764.8
Mar. 5, 2021 (DE) .......................... 102021105398.6

(51) Int. Cl.
*E21B 4/02* (2006.01)
*E21B 7/06* (2006.01)

(52) U.S. Cl.
CPC ................ *E21B 4/02* (2013.01); *E21B 7/061* (2013.01); *E21B 7/068* (2013.01)

(58) Field of Classification Search
CPC ............ E21B 4/02; E21B 7/06; E21B 21/002; E21B 7/061; E21B 7/068
See application file for complete search history.

(56) References Cited

U.S. PATENT DOCUMENTS 266,942 A 10/1882 Wilkins
1,151,602 A * 8/1915 Minue .................. F01B 1/0644
91/161

(Continued)

FOREIGN PATENT DOCUMENTS

CN 108086912 5/2018
CN 110500041 11/2019

(Continued)

OTHER PUBLICATIONS

International Search Report issued Aug. 2, 2021 in PCT/EP2021/061992 (including English translation).

(Continued)

*Primary Examiner* — D. Andrews
(74) *Attorney, Agent, or Firm* — Womble Bond Dickinson (US) LLP

(57) ABSTRACT

A drilling turbine (1) comprises a housing (2) in which a drive shaft (6) is rotatably mounted, and a turbine impeller (3) designed to set the drive shaft (6) in rotation. The drive shaft (6) is connectable to a drilling tool (4, 5). The housing has at least one drive line (9, 12) with at least one drive mouth (19), through which a drive fluid can be directed onto the turbine impeller (3). The turbine impeller (3) is connected directly to the drive shaft (6) such that, during operation, the turbine impeller (3), the drive shaft (6) and the drilling tool (4, 5) rotate at the same rotational speed. The housing (2) has a diameter of about 2.5 to about 15 cm and/or a length of about 3 cm to about 15 cm. A method for directional drilling uses a drilling turbine of this type.

34 Claims, 8 Drawing Sheets

(56) References Cited

U.S. PATENT DOCUMENTS

| | | | | |
|---|---|---|---|---|
| 1,482,702 | A | * | 2/1924 | Scharpenberg ............ E21B 4/02 415/113 |
| 1,581,465 | A | * | 4/1926 | Morton ...................... E21B 4/02 415/224 |
| 2,184,066 | A | * | 12/1939 | Zublin .................... E21B 10/12 175/96 |
| 2,521,976 | A | | 9/1950 | Hays |
| 2,591,488 | A | | 4/1952 | Yost |
| 2,983,481 | A | * | 5/1961 | Tiraspolsky ............ E21B 4/003 415/142 |
| 3,127,933 | A | * | 4/1964 | Graham ................ E21B 33/127 175/320 |
| 4,105,377 | A | * | 8/1978 | Mayall ...................... E21B 4/02 418/173 |
| 4,266,619 | A | * | 5/1981 | Bodine .................. E21B 4/006 175/107 |
| 4,333,539 | A | * | 6/1982 | Lyons ...................... E21B 23/00 175/107 |
| 4,553,611 | A | * | 11/1985 | Lyons ...................... F03B 13/02 175/100 |
| 4,639,258 | A | * | 1/1987 | Schellstede .......... B01D 33/275 96/204 |
| 4,678,045 | A | | 7/1987 | Lyons |
| 4,787,465 | A | | 11/1988 | Dickinson, III et al. |
| 5,392,858 | A | | 2/1995 | Peters et al. |
| 5,413,184 | A | | 5/1995 | Landers |
| 6,167,968 | B1 | | 1/2001 | Allarie et al. |
| 6,220,372 | B1 | | 4/2001 | Cherry |
| 6,263,984 | B1 | | 7/2001 | Buckman, Sr. |
| 2009/0159281 | A1 | | 6/2009 | Herrera |
| 2019/0264544 | A1 | | 8/2019 | Huang et al. |
| 2019/0338598 | A1 | | 11/2019 | Hahn et al. |
| 2019/0338609 | A1 | | 11/2019 | West et al. |

FOREIGN PATENT DOCUMENTS

| | | | | |
|---|---|---|---|---|
| DE | 881484 C | | 6/1953 | |
| GB | 2545062 A | * | 6/2017 | ........... E21B 17/028 |

OTHER PUBLICATIONS

Written Opinion issued Aug. 2, 2021 in PCT/EP2021/061992 (No. English translation).

* cited by examiner

DRILLING TURBINE AND METHOD OF DIRECTIONAL DRILLING

RELATED APPLICATIONS

This is a Bypass Continuation of International Patent Application No. PCT/EP2021/061992 filed May 6, 2021, and published as WO 2022/224391A1. Priority is claimed to DE 10 2020 205 764.8 filed May 7, 2020, and to DE 10 2021 105 398.6 filed Mar. 5, 2021. The contents of the aforementioned applications are incorporated by reference in their entirety

BACKGROUND OF THE INVENTION

The invention relates to a drilling turbine having a housing in which a drive shaft is rotatably mounted, and having a turbine impeller which is designed to set the drive shaft in rotation, the drive shaft being connectable to a drilling tool, and the housing having at least one drive line with at least one drive mouth through which a drive fluid can be directed to the turbine impeller. The invention also relates to a method for directional drilling.

U.S. Pat. No. 4,33,539 discloses a drilling turbine of this type and a method of this type. This known drilling turbine has a compressed air turbine which drives a drilling tool via a reduction gear.

The disadvantage of this known drilling turbine is that it has a large overall length, so that directional drill holes can only be established with a large minimum radius. Furthermore, the use in deep, water-filled drill holes is difficult or impossible due to the hydrostatic pressure.

On the basis of the prior art, the object of the invention is therefore to provide a drilling turbine and a method for directional drilling, which allows for narrow minimum radii and can also be applied in water-bearing rock strata. The object of the invention is also to provide a drilling turbine and a method for directional drilling which is suitable for hard rock.

SUMMARY OF THE INVENTION

According to the invention, this object is achieved by a drilling turbine according to claim 1 and a method according to claim 19. Advantageous further developments of the invention are found in the subclaims.

According to the invention, a drilling turbine having a housing is proposed. The housing can be made of a metal or an alloy or a plastic material, in particular fiber-reinforced plastic materials. The housing can be manufactured by primary forming and/or machining. The housing can have a basic cylindrical shape. A plurality of lines or fluid channels can be formed in the housing to transport a supplied drive fluid to predeterminable locations within the housing or to allow it to exit through various openings arranged at predeterminable locations.

At least one drive shaft is rotatably mounted in the housing. The drive shaft can also be made of a metal or an alloy by primary forming and/or machining. The drive shaft can be balanced in a manner known per se to allow smooth running in the housing and to prevent or reduce vibrations. The drive shaft can be mounted by means of a rolling bearing or a plain bearing or a hydrodynamic bearing.

Furthermore, the drilling turbine according to the invention includes at least one turbine impeller which is designed to set the drive shaft in rotation. For this purpose, the turbine impeller can be joined to the drive shaft, for example by bonding and/or soldering and/or welding and/or clamping. The turbine impeller can be made of a metal or an alloy or a plastic material, in particular of fiber-reinforced plastic materials. The turbine impeller can be manufactured in one piece, for example by milling or laminating. This can reduce imbalances and/or increase strength. In other embodiments of the invention, the turbine impeller can be made in multiple pieces, the individual components being joined for final assembly. This can facilitate repair and/or maintenance.

It is also proposed to connect the drive shaft to a drilling tool during the operation of the drilling turbine. The drilling tool can be selected from a milling cutter or a drill bit or a grinding tool. The drilling tool can be made of a metal or an alloy. The drilling tool can be provided with an optional hard coating, for example TiN or DLC or diamond. In some embodiments of the invention, the drilling tool can be directly connected to the drive shaft, or the drive shaft can form the shank or part of the shank of the drilling tool. In other embodiments of the invention, the drilling tool can be connected to the drive shaft via a clamping tool. In yet other embodiments of the invention, the drilling tool can be attached to the turbine impeller.

In some embodiments of the invention, all components of the drilling turbine are made of temperature resistant materials and, for example, no elastomers are installed. This gives the advantage that the drilling turbine can also be operated at very high operating temperatures, for example in geothermal reservoirs.

In some embodiments of the invention, a clamping tool can be provided which is connected to the drive shaft and in which the drilling tool is received. This can allow for changing the drilling tool quickly.

Finally, the housing includes at least one drive line. A first end of the drive line is made as a drive mouth or is provided with at least one drive mouth. During the operation of the drilling turbine, a drive fluid can be supplied to the drive line via the opposite second end. The drive fluid exits the drive line via the drive mouth and is directed to the turbine impeller, causing the turbine impeller to generate drive torque on the drive shaft. The drive mouth can be designed as a freely blowing-out pipe end. This allows the drilling turbine to have a particularly simple design. In other embodiments of the invention, the drive mouth can contain, or consist of, a nozzle, the geometry of which is designed in such a way that the flow velocity and/or the jet diameter and/or the jet geometry of the exiting drive fluid is adapted to predeterminable set values.

According to the invention, it is proposed to connect the turbine impeller directly to the drive shaft. Likewise, the drilling tool or the clamping tool for receiving the drilling tool is directly connected to the drive shaft so that during operation the turbine impeller and the drive shaft and the drilling tool rotate at the same rotational speed. This feature has the effect of increasing the rotational speed and reducing the torque compared to known drilling turbines. Because of the high rotational speed and the low torque, cutting tools with grinding or scraping rock destruction mechanisms and low bit aggressiveness are suitable. As a result, only a low torque needs to be applied to the drive shaft to rotate the drilling tool. As a result, very fine drill hole cuttings are produced during the drilling process so that a suspension is formed in admixture with the back-flowing drive fluid. In addition, a drill hole with a uniform and straight drill hole wall is formed. Both have an advantageous effect on the removal of the drill hole cuttings from the drill hole. Since the drill bit is directly connected to the turbine impeller without an intermediate gearbox, the drilling turbine can be made very small and compact. This renders possible a small deflection radius of the drill hole. In addition, there are no mechanical losses or weak points due to a possible gearbox.

According to the invention, the housing has a length of about 3 cm to about 15 cm and/or a diameter of about 3 cm to about 7.5 cm. The compact external dimensions allow for small guide radii so that directional drill holes at an angle of about 30° to about 90° or about 35° to about 60° can also be carried out even from comparatively small vertical drill holes having a diameter of, for example, about 10 cm to about 15 cm or about 10 cm to about 25 cm.

In some embodiments of the invention, the drilling turbine is designed as a constant pressure turbine. A turbine with constant pressure blading can have a greater breakaway torque compared to other turbines. This reduces the risk of the drilling tool jamming during the drilling process. Another advantage can be that the turbine drive can be made very compact.

In some embodiments of the invention, the drilling turbine can be operated with recycled water. For this purpose, the drive fluid exiting the drilling turbine is collected, cleaned of drill hole cuttings and impurities, and supplied back to the drilling turbine via a pump as recycled water. The cleaning operation can be accomplished via at least one solids separator and/or at least one filter layer and/or at least one cyclone separator and/or via at least one settling tank.

In some embodiments of the invention, the housing of the drilling turbine is provided with a plurality of guide skids. This can allow for an easy feed of the drilling turbine through the drill hole and/or can increase the directional stability during drilling.

In some embodiments of the invention, the plurality of guide skids can be selected between about 3 and about 8 guide skids. This allows for stable guidance in the case of small contact surfaces so that the feed forces can be reduced.

In some embodiments of the invention, the outer surfaces of the guide skids are disposed on an envelope having a diameter that is approximately equal to the diameter of the drilling tool.

In some embodiments of the invention, the diameter of the envelope can be between about 0% and about 5% less than the diameter of the drilling tool. This may avoid or reduce jamming of the drilling tool in the drill hole.

In some embodiments of the invention, the housing has a single supply line that is provided with a second hose coupling. The second hose coupling can be made in the form of a quick coupling to allow for rapid changeover in the field. As a result, lines of different lengths and/or different diameters can be connected to adapt the drilling turbine to different operating conditions.

In some embodiments of the invention, the supply line arranged in the housing can be divided into a plurality of sub-supply lines. This allows the drive fluid to be distributed in the housing in such a way that a partial flow is available where it is needed. At the same time, the drilling turbine can be connected to a central utility line that allows for easy handling.

In some embodiments of the invention, at least one sub-supply line is connected to at least one drive line. As a result, multiple drive lines or multiple drive mouths can be arranged along the circumference of the housing, creating a redundant and uniform flow of the drive element. This can increase the operational reliability of the drilling turbine and/or the torque at the drive shaft and/or can make the power output more uniform.

In some embodiments of the invention, at least one return line is connected to at least one sub-supply line. In some embodiments of the invention, the return line terminates at at least one return opening that is arranged at the housing end that is opposite to the drilling tool. This allows for a uniform feed of the drilling turbine so that it can produce a directional drill hole having the desired trajectory. The return opening can be designed as a freely blowing-out pipe end. As a result, the drilling turbine can have a particularly simple design. In other embodiments of the invention, the return opening can contain, or consist of, a nozzle, the geometry of which is designed in such a way that the flow velocity and/or the jet diameter and/or the jet geometry and/or the jet direction of the exiting drive fluid is adapted to predeterminable set values. As a result, control of the drilling turbine during feed can be achieved and/or the torque acting on the housing due to the cutting forces can be dissipated. The drilling turbine can be stabilized by tilting the nozzle orientation slightly outward at an angle.

In some embodiments of the invention, the housing has at least one first supply line and at least one second supply line. In some embodiments of the invention, the first supply line and the second supply line can be concentric with respect to each other. In this case, the drilling turbine can be supplied with drive fluid via a supply line which has an inner line and an outer line surrounding the inner line. The effect of these features is that the amount of fluid supplied to the return lines and the amount of fluid supplied to the drive lines can be controlled separately from one another. As a result, the feed force and the drive torque can be adjusted separately from one another.

Some embodiments of the invention can provide a plurality of first supply lines so as to be able to adjust in this way the pressure and/or amount of drive fluid in different return lines having at least one return opening in each case separately from one another. As a result, the direction of feed of the drilling turbine according to the invention can be influenced during the drilling process.

In some embodiments of the invention, the drive line has at least one longitudinal portion that includes an angle of about 20° to about 70° with respect to the longitudinal axis of the drilling turbine. In other embodiments of the invention, the drive line has at least one longitudinal portion which includes an angle of about 30° to about 60° with respect to the longitudinal axis of the drilling turbine. In yet other embodiments of the invention, the drive line has at least one longitudinal portion that includes an angle of about 45° with respect to the longitudinal axis of the drilling turbine. In some embodiments of the invention, the turbine impeller is provided with a plurality of baffle elements, each having a baffle surface. The drive line can have at least one longitudinal portion that is approximately parallel to the normal vector of the baffle surfaces. As a result, the generated torque and/or rotational speed can be increased.

In some embodiments of the invention, the baffle elements can have curved baffle surfaces. The curvature can be concave on the side facing the jet. This can increase the efficiency of the constant pressure turbine compared to planar baffle surfaces.

In some embodiments of the invention, the housing has at least one mounting chamber containing at least one ball bearing for the drive shaft. The mounting by means of at least one ball bearing has the advantage of low frictional resistance even at high rotational speeds and at high forces acting in the axial direction. Furthermore, ball bearings as wearing parts can be replaced at low cost.

In some embodiments of the invention, the drive shaft can be mounted in the housing by at least one hydro-mount and/or at least one plain bearing.

In some embodiments of the invention, the housing has at least one mounting chamber and at least one connecting line, the connecting line, which starts from the supply line and/or a sub-supply line, opens into the mounting chamber. As a result, a part of the drive fluid can be supplied to the mounting chamber. This embodiment has the advantage of producing good lubrication and cooling of the bearings in a simple manner. Furthermore, sealing of the mounting chamber can be dispensed with since drill hole cuttings cannot be transported into the mounting chamber against the flow of the drive fluid or are discharged from the mounting chamber by the drive fluid. Therefore, frictional losses due to sealing are avoided.

In some embodiments of the invention, the drive shaft can have at least one hollow drill hole. This hollow drill hole can be connected to at least one flushing opening through which a fluid can be directed to an end face of the drilling tool during the operation of the drilling turbine. This renders possible the lubrication and/or cooling of the drilling tool and the removal of the resulting drill hole cuttings so that rapid advance can be made possible in the case of a long service life of the drilling tool.

In some embodiments of the invention, the housing has a diameter of about 3 cm to about 7.5 cm. In other embodiments of the invention, the housing has a diameter of about 2.5 cm to about 4.5 cm.

In some embodiments of the invention, the housing has a length of about 3 cm to about 7 cm. In other embodiments of the invention, the housing has a length of about 4 cm to about 6 cm. The compact external dimensions allow for small guide radii, so that directional drill holes at an angle of about 30° to about 90° or about 35° to about 60° can be carried out from comparatively small vertical drill holes having a diameter of, for example, about 10 cm to about 15 cm or about 10 cm to about 25 cm.

In some embodiments of the invention, the turbine impeller and/or a clamping tool and/or the drilling tool has an imbalance. Since the cutting speed of a rotating drilling tool increases with increasing distance from the axis of rotation, it is avoided that the center of the drilling tool is always positioned at the same point in the rock. The amount of material removed can thus be increased.

In some embodiments of the invention, the turbine impeller and/or a clamping tool and/or the drilling tool has at least one opening into which at least one weight can be received. This allows an unbalance to be adjusted by inserting weights of different masses into different openings. The opening can have a polygonal or round cross-section. The opening can be designed as an annular groove into which an annular weight can be inserted. For this purpose, the weight can be inhomogeneous or the annular groove can be introduced off-center.

In some embodiments of the invention, the weight can have a mass of about 0.1 g to about 10 g. In other embodiments of the invention, the weight can have a mass of about 0.5 g to about 3 g. In some embodiments of the invention, the weight can have a mass of about 10 g to about 100 g. In other embodiments of the invention, the weight can have a mass of about 15 g to about 50 g. In yet other embodiments of the invention, the weight can have a mass of about 10 g to about 20 g. The indicated mass range allows for the creation of an imbalance which is, on the one hand, sufficiently large to allow for efficient feed and, on the other hand, still allows to control the drilling turbine.

The invention also proposes a method for directional drilling, in which an above described drilling turbine is used. Directional drilling is understood to mean, for the purposes of the present description, a deep drill bore, the direction of which is influenced. In the simplest case, this ensures that the drill hole is perpendicular starting from the surface of the earth. In further embodiments of the invention, the drill hole can be made in a desired direction. For example, a drill hole can branch off almost horizontally starting from a vertically running drill hole. In this way, reservoirs can be reached in a targeted manner or new pathways can be created that improve the fill rate of the drill hole. The method according to the invention can be used, for example, for the exploitation of geothermal energy, for well construction or for oil production.

In some embodiments of the invention, the directional drilling can be performed starting from a first drill hole. In some embodiments, the first drill hole can be cased. In some embodiments, the first drill hole can have a larger diameter than the directional drill hole. The first drill hole can have a diameter between about 8 cm and about 22 cm. In some embodiments of the invention, the drilling turbine can be inserted into the first drill hole to a predeterminable location where it can be aligned at a predeterminable angle to the wall of the first drill hole by means of a deflection shoe. In some embodiments of the invention, a first drilling tool is used to drill through a casing of the first drill hole and a second drilling tool is used to advance the directional drill hole. The first drilling tool can be a milling head for metal working and the second drilling tool can be a drill bit for producing a small-bore directional drill hole in hard rock. In other embodiments of the invention, the identical drilling tool is used to drill through the casing and to advance the directional drill hole.

In some embodiments of the invention, the drilling turbine according to the invention is used to drill through a casing of the first drill hole. The advancing of the small-bore directional drill hole can then also be carried out by means of another known method. In other embodiments of the invention, a known method is used to drill through a casing of the first drill hole. Provided that the vertical drill hole does not have a casing, the method step of drilling through the casing can also be omitted. Subsequently, the small-bore directional drill hole is advanced with the drilling turbine according to the invention, as described above.

In some embodiments of the invention, an incompressible fluid is used as the drive fluid to operate the drilling turbine. This allows an operation even when the drilling turbine is fully submerged in liquid.

In some embodiments of the invention, the drive fluid can contain, or consist of, water. This allows an operation in well construction or geothermal reservoirs without introducing impurities.

In some embodiments of the invention, the drive fluid can be supplied at a pressure of about 80 bar to about 200 bar. In other embodiments of the invention, the drive fluid can be supplied at a pressure of about 100 bar to about 160 bar. In some embodiments of the invention, the drive fluid can be supplied at a flow rate of about 80 l/min to about 300 l/min. In other embodiments of the invention, the drive fluid can be supplied at a flow rate of about 150 l/min to about 250 l/min. This pressure can also be supplied to the drilling turbine through comparatively small hose diameters over long distances of more than 150 m or more than 500 m or more than 1000 m or more than 3000 m so that the drive power resulting from the product of pressure and flow rate can be reliably supplied even at large drill hole depths.

In some embodiments of the invention, the drive shaft and the drilling tool can rotate at a rotational speed of about 15,000 $min^{-1}$ to about 35,000 $min^{-1}$ during operation. In other embodiments of the invention, the drive shaft and the drilling tool can rotate during operation at a rotational speed of about 20,000 min$^{-1}$ to about 30,000 min$^{-1}$. The rotational speed during the operation of the drilling tool is established from the torque balance between the drive torque applied by the turbine impeller and the counter torque generated by the cutting forces of the drilling tool. In some embodiments of the invention, the idle speed of the drilling tool can be between about 50,000 min$^{-1}$ and about 100,000 min$^{-1}$.

In some embodiments of the invention, a torque of about 0.5 Nm to about 5 Nm can be generated at the drive shaft and the drilling tool. In other embodiments of the invention, a torque of about 1 Nm to about 3 Nm can be generated at the drive shaft and the drilling tool. In yet other embodiments of the invention, a torque of about 1.5 Nm to about 2.5 Nm can be generated at the drive shaft and the drilling tool. Due to the high rotational speed and the torque which is low compared to known drilling turbines, cutting tools with grinding or scraping rock destruction mechanisms are suitable. As a result, very small drill hole cuttings are produced during the drilling process so that a suspension is formed in admixture with the back-flowing drive fluid. In addition, a drill hole having a uniform and straight drill hole wall is formed. Both occurrences have an advantageous effect on the removal of the drill hole cuttings from the drill hole.

In some embodiments of the invention, the drive fluid can be supplied via a supply line which includes a first longitudinal portion having a first diameter and a second longitudinal portion having a second diameter, the first diameter being larger than the second diameter. The first longitudinal portion avoids the occurrence of high pressure losses over the greater part of the distance to be covered, and the second longitudinal portion is chosen to be small enough to allow the line to pass through a deflection shoe even in a directional drill hole of small diameter and with a small radius. In some embodiments of the invention, the first diameter is selected between about 25 mm and about 100 mm or between about 35 mm and about 60 mm. The second diameter can be selected between about 5 mm and about 20 mm, or between about 10 mm and about 16 mm.

BRIEF DESCRIPTION OF THE DRAWINGS

The invention shall be explained in more detail below with reference to exemplary embodiments and drawings without limiting the general concept of the invention. In these drawings.

DETAILED DESCRIPTION

Figure 1:
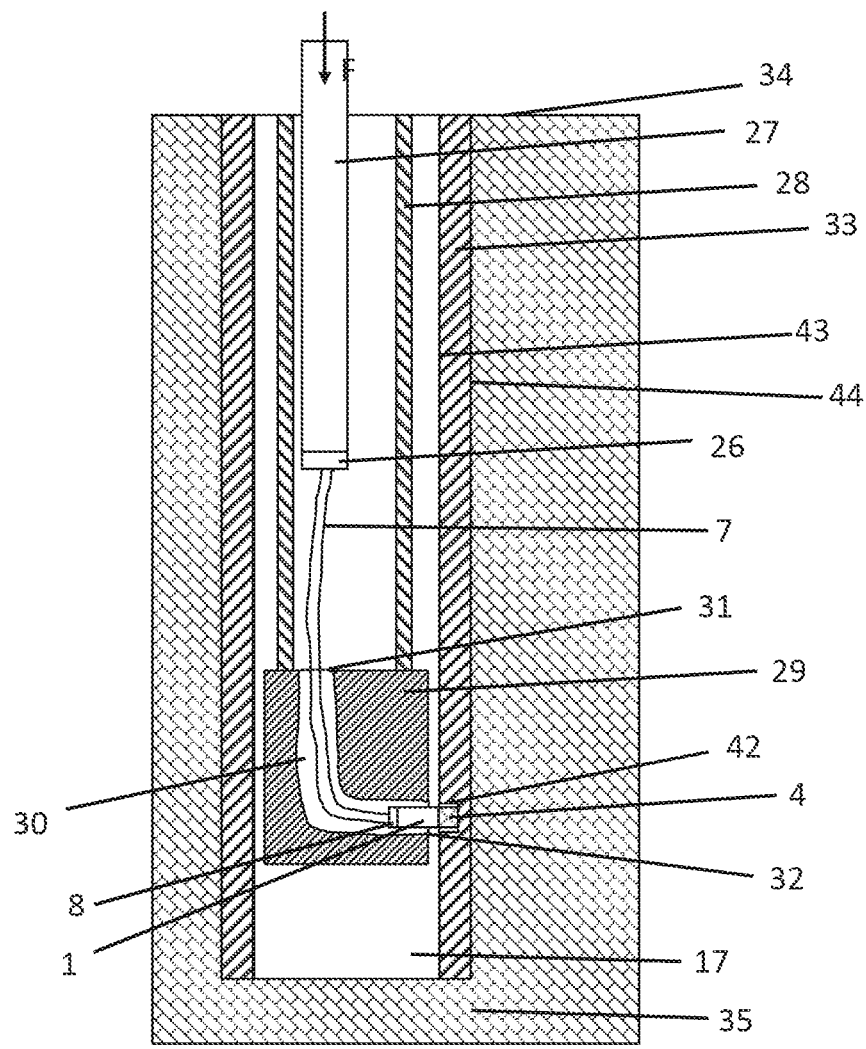
FIG. 1 shows a first method step when using the drilling turbine according to the invention in a cased geothermal drill hole.
Figure 2:
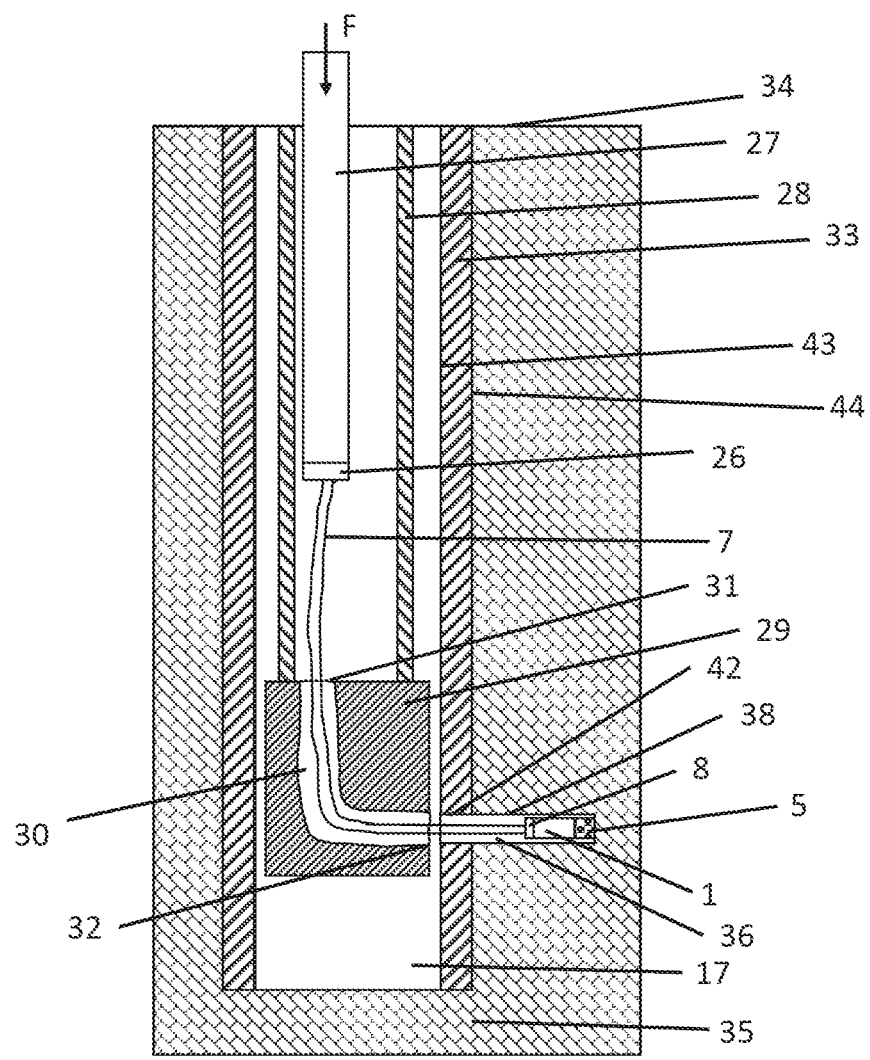
FIG. 2 shows a second method step when using the drilling turbine according to the invention in a cased geothermal drill hole.

FIG. 1 and FIG. 2 show the exemplary use of the drilling turbine according to the invention in a cased geothermal drill hole 17. The geothermal drill hole 17 extends along a predeterminable direction, for example vertically, from the surface 34 downward through the earth layers 35 to the desired depth. In some embodiments of the invention, the geothermal drill hole can have a depth of more than 150 m, or more than 500 m, or more than 1000 m, or more than 3000 m. The drill hole casing 33 can have an inner diameter of about 10 cm to about 20 cm. The drill hole casing 33 can be made of a metal or an alloy, e.g., of a steel.

FIG. 1 shows the drilling turbine according to the invention during the first method step when producing the drill hole casing bore 42 which penetrates the drill hole casing 33. The device used for this purpose includes at least one pipe 28, which extends downwardly through the drill hole casing 33 over a preselected distance. The pipe 28 can be any pipe of polymeric or metallic material known in the art. A deflection shoe 29 is attached to the end of the pipe 28, for example by bolting, welding, soldering or bonding.

The deflection shoe 29 can have a polyhedral or cylindrical base body made of a metal or an alloy or a plastic material. The deflection shoe 29 has a first opening 31 facing the clear cross-section of the pipe 28. Furthermore, the deflection shoe 29 has a second hole 32 formed in a side surface and facing the drill hole casing 33. The first and second holes 31 and 32 in the deflection shoe 29 are connected to one another by a deflection passage 30. The deflection shoe 29 can be aligned by rotating the pipe 28 to a predetermined position within the drill hole casing 33 and then be fixed. Due to the length of the pipe 28 and the orientation of the deflection shoe 29, the second drill hole can thus be aligned with the location where the drill hole casing 33 shall be penetrated. The first hole 31 and the second hole 32 can be connected to each other by the deflection passage 30 at a predeterminable angle. FIGS. 1 and 2 show an angle of approximately 90°. In other embodiments of the invention, the angle can be between about 20° and about 90°, or between about 20° and about 70°, or between about 25° and about 45°. A supply line is guided within the pipe 28 and is designed to supply a drive fluid to the drilling turbine. In the illustrated exemplary embodiment, the supply line includes a first longitudinal portion 27 having a first diameter and a second longitudinal portion 7 having a second diameter, the first diameter being larger than the second diameter. The connection between the first longitudinal portion 27 and the second longitudinal portion 7 is established by means of an optional hose coupling 26, which allows for a pressure-tight connection and is detachable in a simple manner. In other embodiments, the hose coupling 26 can also be omitted. In particular in the case of short line lengths, it is also possible to use a line having a constant diameter. The supply line can be designed as a hose line to facilitate handling. At least the second longitudinal portion 7 can be made of a plastic material, a metal or a composite material and can be designed for an internal operating pressure of at least 200 bar. The outer diameter of the second longitudinal portion 7 can be 20 mm and the inner diameter can be 12 mm. The length of the small-bore hose line 7 corresponds at least to the bore length of the directional drill hole 38.

The end of the second longitudinal portion 7 opposite the hose coupling 26 is connected to the drilling turbine 1 by means of an optional second hose coupling 8 so that the drive fluid can be conveyed from the surface 34 by means of a pump (not shown) through the first longitudinal portion 27 into the second longitudinal portion 7 and from there to the drilling turbine 1.

In order to make the drill hole casing bore 42, the drilling turbine 1 with the second longitudinal portion 7 of the supply line is guided through the deflection shoe 29 to the inner side 43 of the drill hole casing 33. The flexibility, dimensions and surface property of the second longitudinal portion 7 allow the pipe to be deflected by the deflection shoe 29 without significant frictional losses. In the first method step, the drilling turbine 1 is equipped with a milling head 4. By supplying a drive fluid, for example water, with a pressure of about 100 bar to about 200 bar or of about 100 bar to about 160 bar and with a flow rate of about 100 l/min to about 300 l/min or of about 150 l/min to about 250 l/min, the milling head 4 is set in rotation. A linear feed is used to chip the material of the drill hole casing 33 and allow the production of the drill hole casing bore 42. After about 20 minutes to about 40 minutes, the drill hole casing 33 having a wall thickness of about 5 mm is drilled through.

After producing the drill hole casing bore 42, the drilling turbine 1 is brought via the drill hole casing 33 in an optional method step to the surface 34 where the drilling tool can optionally be changed. For example, the milling head 4 can be replaced with a drill bit 5. In other embodiments, the change of the drilling tool can be omitted.

FIG. 2 shows the drilling turbine according to the invention during the second method step when producing the directional drill hole 38 in the earth layer 35 starting from the drill hole wall 44 at the exit of the drill hole casing bore 42. Identical components of the invention are followed by the same reference signs, as a result of which the following description is limited to the essential differences.

The drilling turbine 1 is provided with a drill bit 5, as described above, and is inserted into the cased geothermal drill hole 17 using the pipe 28 and the deflection shoe 29, as described above, so that the drilling turbine 1 can be passed through the previously made drill hole casing bore 42 so that the end face of the drill bit 5 is in contact with the inner side 43 of the drill hole wall 44. By supplying the drive fluid, the drill bit 5 is set in rotation and a feed force is applied so that the directional drill hole 38 is driven into the earth layer 35. The resulting drill hole cuttings are conveyed, together with the drive fluid, as an emulsion to the surface 34 via the annular space 36. The drive fluid is applied to the drilling turbine 1 until a desired drill hole length of the directional drill hole 38 is obtained. The second longitudinal portion 7 of the line is supplied from the drill hole casing 33 behind the drilling turbine 1 by the feed force generated by the drilling turbine 1.

The milling heads 4 and drill bits 5, which are used as drilling tools, have a design known per se for cutting the drill hole casing 33 and/or the earth layer 35 to render possible the production of the drill hole casing bore 42 and/or the directional drill hole. For this purpose, different drill bits can be used for different rock types or soil conditions. The cutting elements of the milling head 4 and the drill bit 5 can be made of cemented carbide, diamond or other materials. In some embodiments, a replacement of the drilling tool can also be omitted, e.g. because a universal drilling tool is used or the geothermal drill hole 17 does not have a drill hole casing 33. The dimensions of the drilling tools 4 and 5 are selected in such a way that the equipped drilling turbine 1 can be guided smoothly through the deflection shoe 29. The drilling turbine 1 equipped with the drill bit 5 is suitable to produce small-bore directional drill holes in earth layers of crystalline hard rock, such as in granite.

A first exemplary embodiment of the drilling turbine 1 according to the invention is explained in more detail with reference to FIG. 3, FIG. 4, FIG. 5, FIG. 6 and FIG. 7.

The drilling turbine 1 has a housing 2, a drive shaft 6 and a turbine impeller 3 and has a modular design. The drilling turbine 1 is dimensioned in such a way that it can be passed together with a fitted milling head 4 or drill bit 5 through the deflection shoe 29. In the illustrated exemplary embodiment, the housing can have a diameter of about 36 mm and a length of about 42 mm.

The housing 2 has a first end at which the drilling tool or a clamping tool designed to receive the drilling tool is located. Furthermore, the housing 2 has an opposite second end at which the second hose coupling 8 is located. Via this coupling, the drive fluid can be introduced into the supply line 9. During operation, the drive fluid is allowed to flow against the turbine impeller 3, as a result of which the turbine impeller 3, the drive shaft 6 and the milling head 4 or the drill bit 5 rotate with identical angular velocity.

Figure 3:
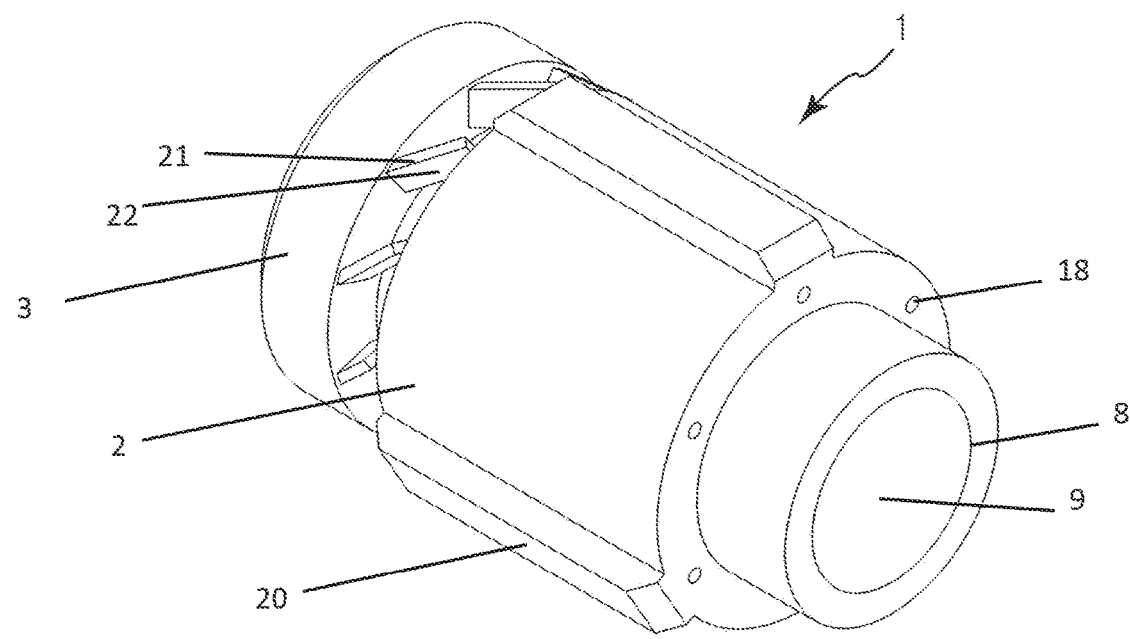
FIG. 3 shows a first view of a first exemplary embodiment of a drilling turbine according to the invention.
Figure 4:
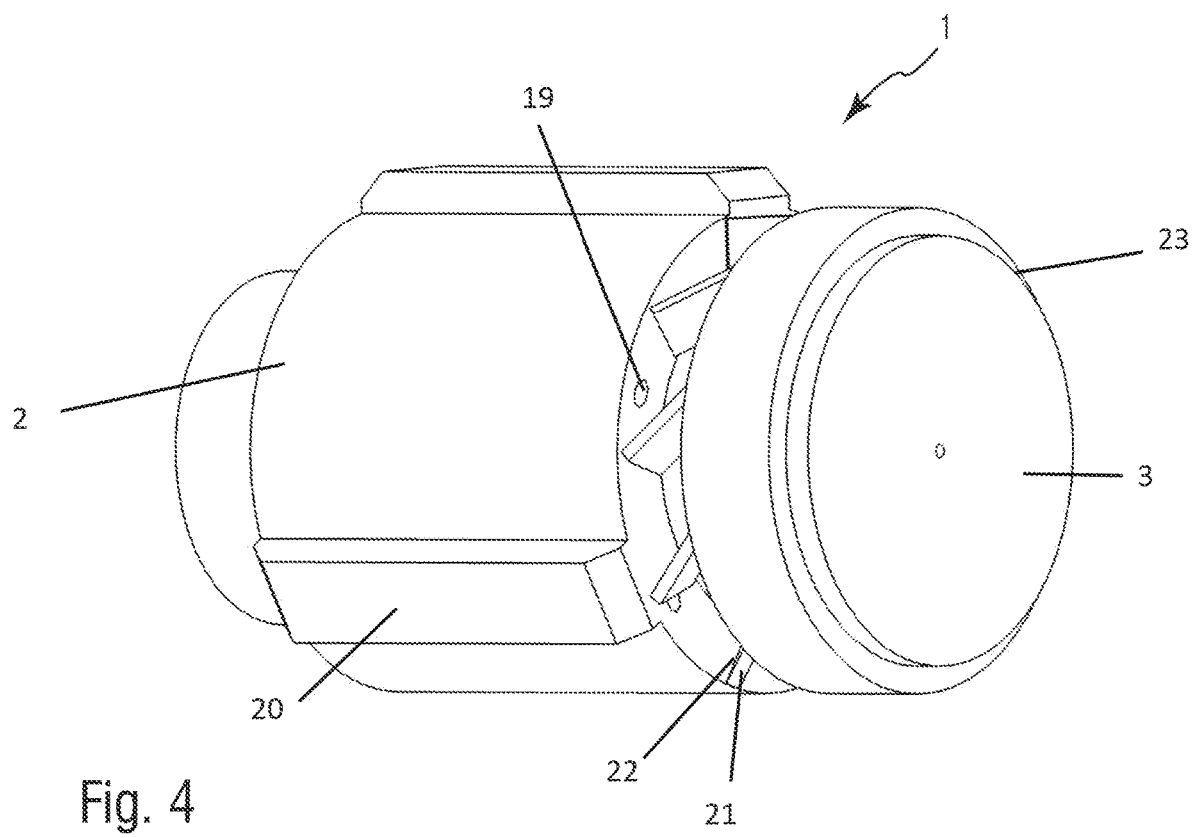
FIG. 4 shows a second view of a first exemplary embodiment of a drilling turbine according to the invention.

As can be seen in FIGS. 3 and 4, three guide skids 20, which are regularly spaced in the circumferential direction, are arranged on the housing 2 of the drilling turbine 1 and have the same or an outer diameter which is slightly smaller than that of the milling head 4 or the drill bit 5. This allows the drilling turbine 1 to be advanced through the resulting directional drill hole 38.

Figure 5:
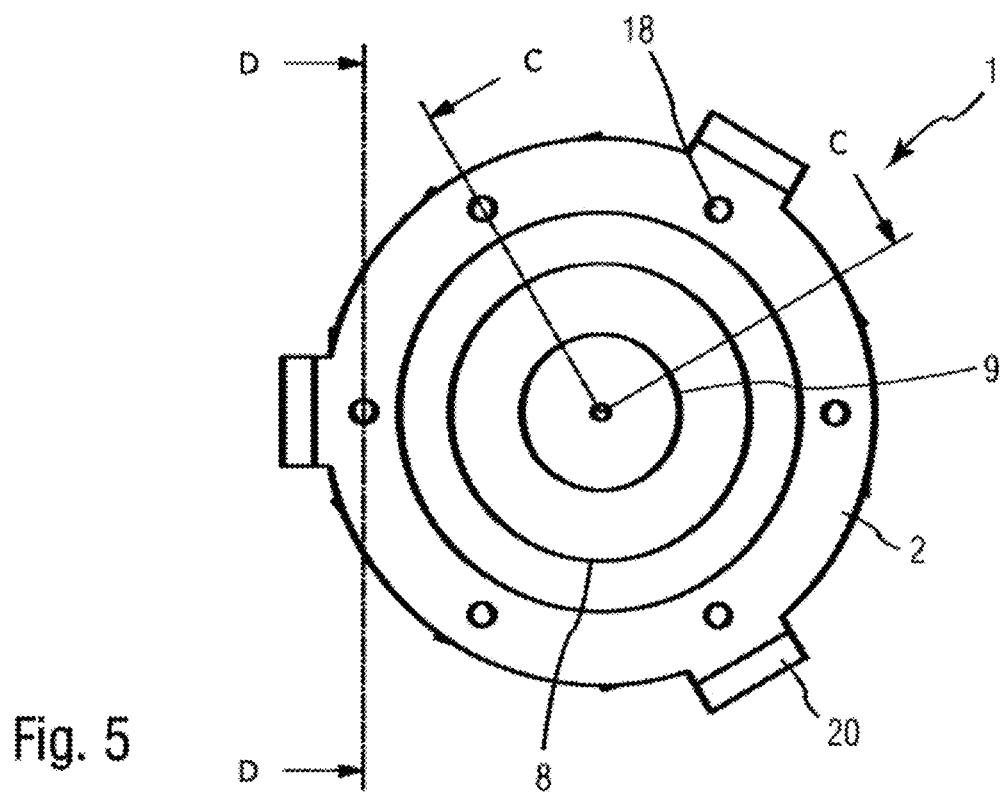
FIG. 5 shows a third view of a first exemplary embodiment of a drilling turbine according to the invention.
Figure 6:
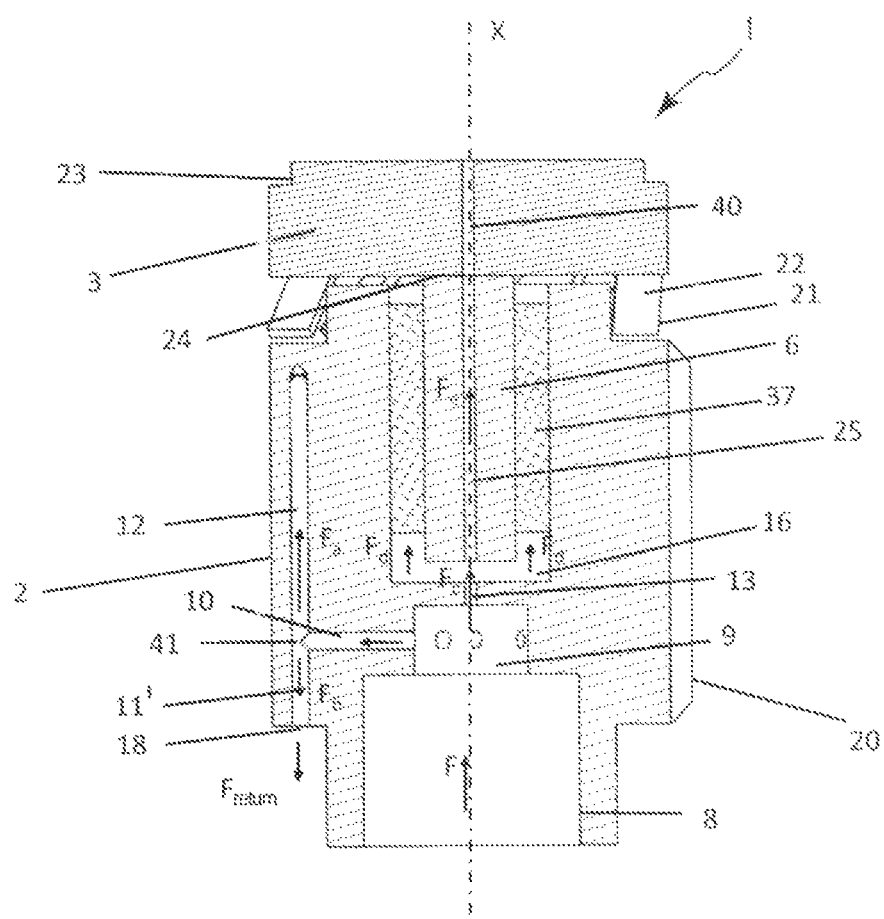
FIG. 6 shows a first section along sectional lines C-C in FIG. 5, of the drilling turbine according to the first exemplary embodiment.

As can be seen in FIGS. 5 and 6, the supply line 9 is divided into six sub-supply lines 10, which extend radially outward in the housing 2. From the sub-supply lines 10, six return lines 11 extend to the rear side of the housing 2, where each of them opens into a return opening 18. During the operation of the drilling turbine, the return lines generate a feed force which engages the drilling tool with the material to be cut. In other embodiments of the invention, the number of return openings 18 can be greater or smaller. The invention does not teach the use of exactly 6 return openings as a solution principle.

Figure 7:
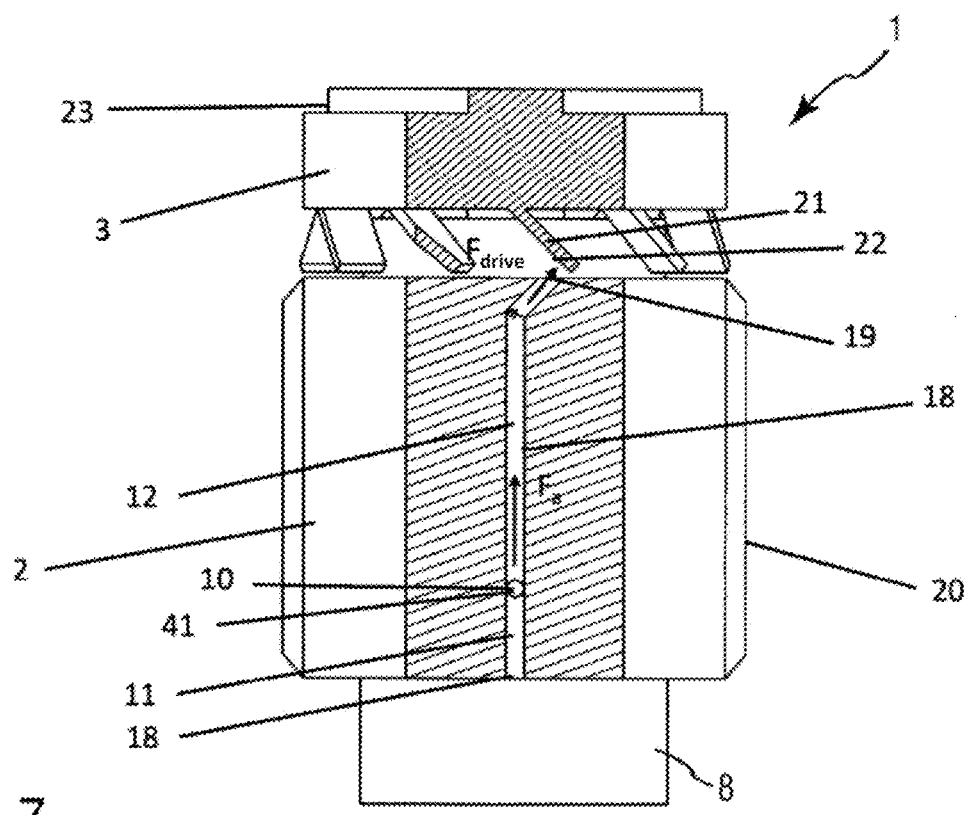
FIG. 7 shows a second section along sectional lines D-D in FIG. 5, of the drilling turbine according to the first exemplary embodiment.

As can best be seen from the sectional views shown in FIG. 6 and FIG. 7, the drilling turbine 1 has six drive lines 12, which are uniformly arranged along the circumference in the housing and extend from each of the six sub-supply lines 10 via a branch 41 to the first side of the housing 2. At the first side of the housing 2, each drive line 12 opens into a drive mouth 19. The drive fluid exiting via the drive mouth 19 impinges on the turbine impeller 3 where it generates a drive torque. In other embodiments of the invention, the number of drive mouths 19 can be greater or smaller. The invention does not teach the use of exactly 6 drive mouths as a solution principle.

Furthermore, FIG. 7 shows that the turbine impeller 3 is provided with a plurality of inclined baffle elements 21, each having a baffle surface 22. The baffle elements 21 can form a constant pressure blading of the turbine impeller 3. FIG. 7 also shows that the drive line 12 has a longitudinal portion which includes an angle of about 20° to about 70° with respect to the longitudinal axis of the drilling turbine. This angle is selected in such a way that the longitudinal portion is approximately parallel to the normal vector of the baffle surfaces. As a result, the generated torque and/or rotational speed can be increased.

FIGS. 6 and 7 also show that the turbine impeller 3 is openly arranged on the housing 2 or is not enclosed by a housing wall in the radial direction. As such, the turbine impeller 3 is located outside the housing 2. This allows the drive fluid and contaminants to be easily discharged without causing the turbine impeller 3 to jam.

As seen in FIG. 6, the housing 2 and drive shaft 6 both extend along the drilling turbine's longitudinal axis X and the impeller is rotatable about the longitudinal axis X. Furthermore, FIG. 6 shows a mounting chamber 16 in which the drive shaft 6 is rotatably mounted on the longitudinal axis X with at least one optional ball bearing 37. A connecting line 13 is arranged between the supply line 9 and the mounting chamber 16, along the longitudinal axis X and allows a part of the drive fluid F to pass through. As a result, the mounting chamber 16 and/or the at least one ball bearing 37 can be flushed with a portion of the drive fluid F. Furthermore, the at least one ball bearing 37 can be cooled. Finally, the drive fluid F can provide a hydrodynamic mounting support for the drive shaft 6.

The drive shaft 6 has at least one optional hollow drill hole 25 along the longitudinal axis X, through which a passage of part of the drive fluid F is also possible. As shown in FIG. 6, the turbine impeller 3 is aligned coaxially with the drive shaft 6 via a shaft-hub connection 24 and is fixed thereto. A hollow drill hole 25 is formed in the drive shaft 6 and also in the turbine impeller 3 and allows the passage of a portion of the drive fluid F. A clamping tool 23 for the drilling tool is provided on the side of the turbine impeller 3 facing away from the housing 2. Thus, the drive fluid exiting through the hollow drill hole 25 can be used to cool the drilling tool and/or to remove the drill hole cuttings. In some embodiments of the invention, the drive fluid exiting at the front can cause rock removal.

The course of the drive fluid in the drilling turbine 1 is indicated by the arrows F. The supplied flow of the drive fluid F passes from the second hose coupling 8 into the supply line 9, where the flow is divided into the exemplarily 6 sub-supply lines 10 and passes in each case to a branch 41. There the flow is divided in each case again into the drive lines 12 and the return lines 11. The fluid flow Fa emerges from the drive mouths 19 of the drive lines 12 of the housing 2 in the form of fluid jets $F_{drive}$ and, through corresponding alignment of the drive mouths 19, strikes the baffle surfaces 22 of the baffle elements 21, as a result of which the turbine impeller 3 including the milling head 4 is driven or set in rotation. The fluid flow Fb emerges from the return openings 18 of the return lines 11 of the housing 2 in the form of fluid jets $F_{return}$, which, due to a corresponding alignment of the return openings 18, generate on the drilling turbine 1 a feed force which acts along the longitudinal axis X in the direction of the milling head 4.

Finally, a fluid flow Fc enters the mounting chamber 16 from the supply line 9 through the connecting line 13. In the mounting chamber 16, this fluid flow Fc splits into two partial flows Fd and Fe. The fluid flow Fd flows through the open ball bearings 37, which are thereby lubricated and/or cooled. Subsequently, the fluid flow Fd exits at the front of the housing 2. The fluid flow Fe flows out of the mounting chamber 16 and first through the hollow drill holes 25 of the drive shaft 6 and the turbine impeller 3 and then exits from the flushing opening 40. From there, it can be directed via flushing channels in the drilling tool to its tool cutting edges so that the fluid flow Fe as a drilling fluid ensures drill hole bottom cleaning and cooling of the drilling tool 4 or 5.

The diameters of the supply line 9, the drive lines 12, the return lines 11, the connecting line 13 and the hollow drill holes 25 of the drilling turbine 1 are selected in such a way that sufficient feed force, torque, rotational speed and flushing fluid are provided. By optimizing the number and/or the cross-sections of the lines, an advantageous ratio of the parameters to one another can be set, as a result of which long operating times of the drilling turbine 1 are possible with the highest possible drilling progress. In some embodiments of the invention, individual drive mouths 19 and/or return openings 18 can be provided with threaded inserts so that they can be easily closed with appropriate screw caps. This allows the drilling turbine 1 to be adapted to different operating conditions. For example, individual return openings 18 can be closed so that drilling operations can be carried out at high rotational speed or high torque and low feed force. For drilling operations in other geological formations, individual drive mouths can be closed to lower the rotational speed or torque and increase the feed force in return.

With reference to FIG. 8, FIG. 9, FIG. 10, FIG. 11 and FIG. 12, a second exemplary embodiment of the drilling turbine 1 according to the invention is explained in more detail. Identical features of the invention are followed by the same reference signs so that the following description is limited to the essential differences.

According to the second exemplary embodiment, the drilling turbine 1 according to the invention has essentially two differences from the first exemplary embodiment described in FIGS. 3-6. These two differences are described individually below. It should be noted that they need not always be realized together in one embodiment. The present invention also extends to a third embodiment and a fourth embodiment which has only one of the below described differences with respect to the first embodiment.

Figure 8:
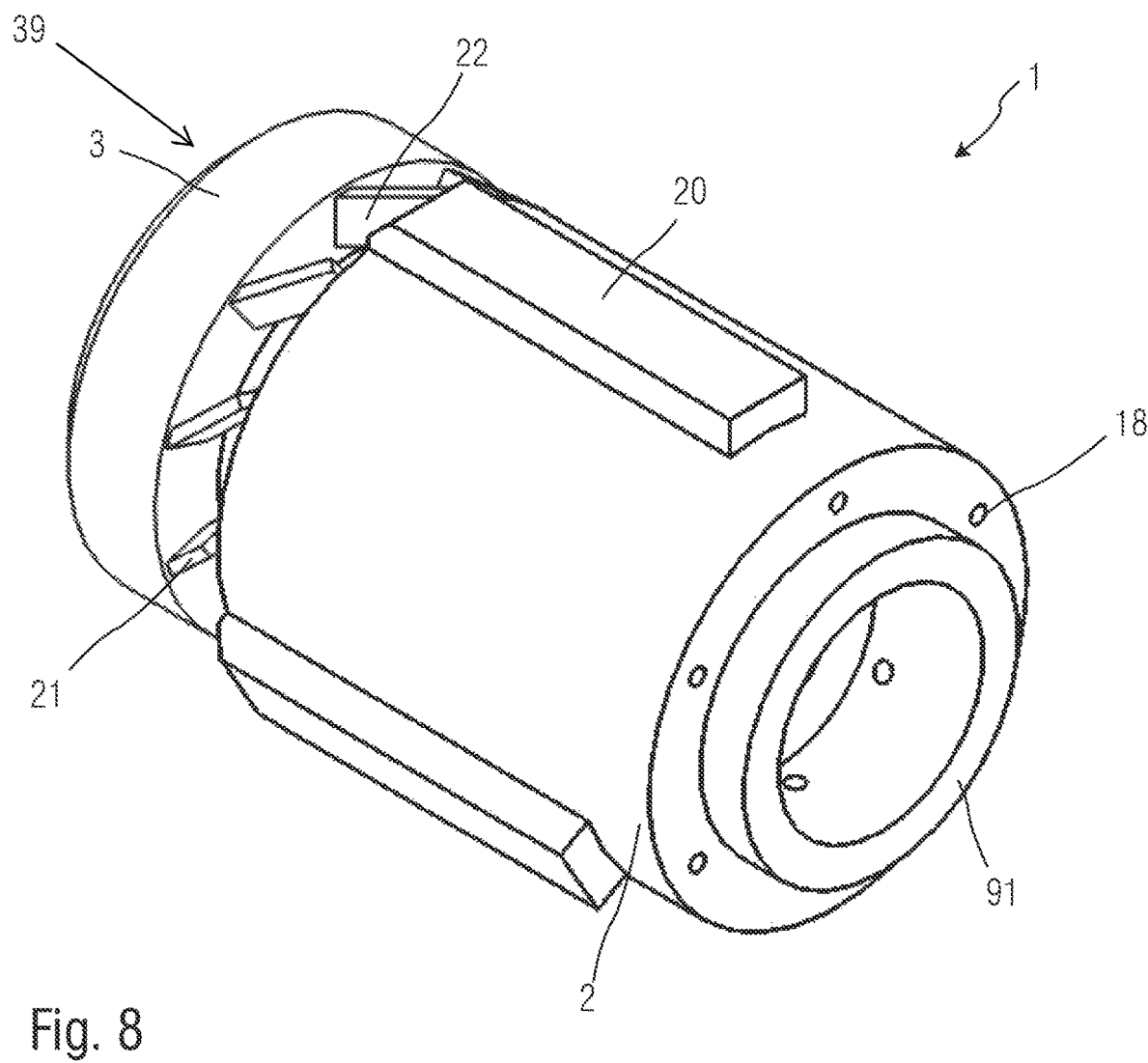
FIG. 8 shows a first view of a second exemplary embodiment of a drilling turbine according to the invention.
Figure 10:
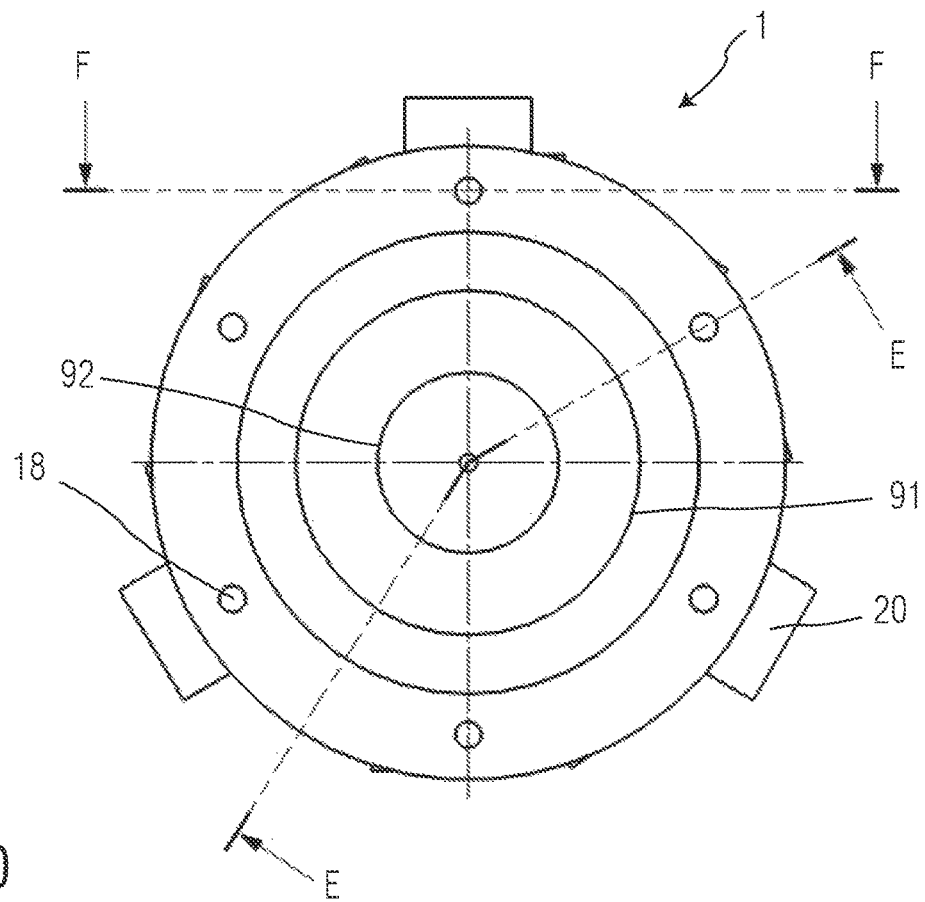
FIG. 10 shows a third view of a second exemplary embodiment of a drilling turbine according to the invention.
Figure 11:
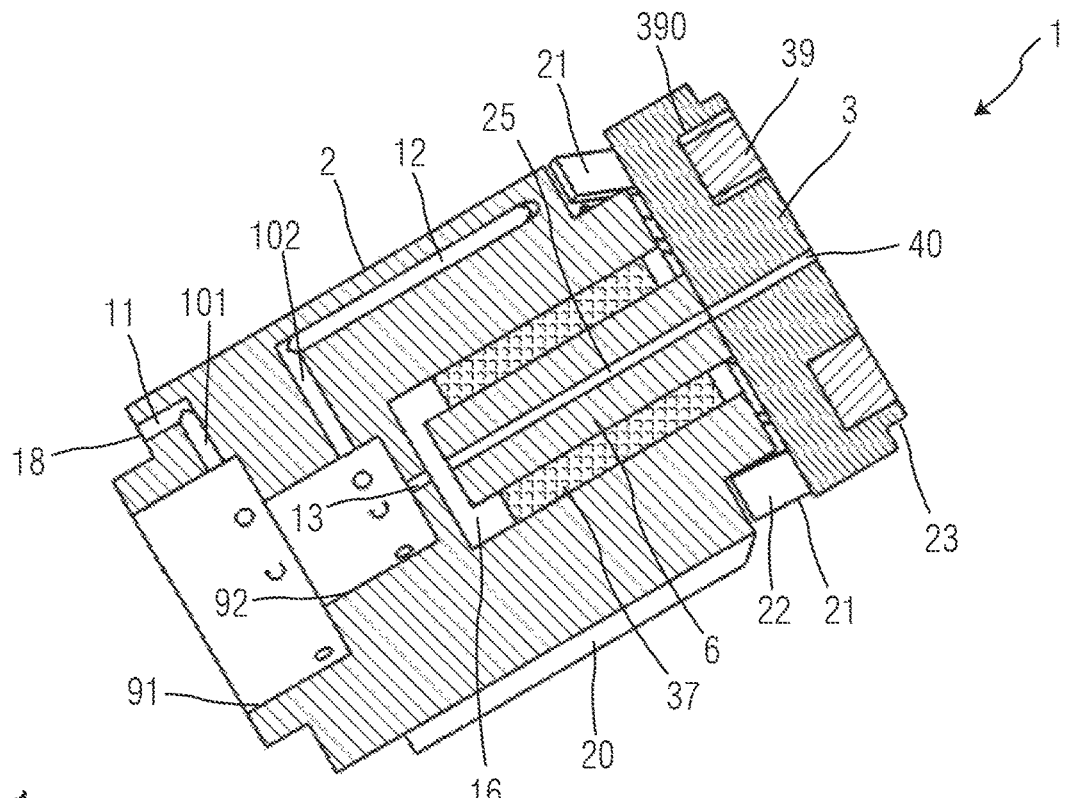
FIG. 11 shows a first section along sectional lines E-E in FIG. 10, of the drilling turbine according to the second exemplary embodiment.

As is clear from FIG. 8 and FIG. 11, in contrast to the first embodiment, the housing 2 does not only have a single supply line 9. On the contrary, a first supply line 91 and a second supply line 92 are provided in the housing 2. In some embodiments of the invention, the first supply line 91 and the second supply line 92 can be arranged concentrically or coaxially, as shown in FIGS. 10 and 11. In other embodiments of the invention, they can also be arranged side-by-side or one on top of the other on the side of the housing 2 opposite the turbine impeller 3.

When the drilling turbine 1 is in operation, the first supply line 91 and the second supply line 92 can each be connected to a hose line or a coaxial hose line with two conveying devices or pumps. This feature has the effect that the drive fluid each supplied to the first supply line 91 and the second supply line 92 can be different in type and/or quantity and/or pressure. Similarly, a single conveying device or pump can be used if one or both of the hose lines contain a throttle or control valve which affects the flow rate or the pressure in the respective line.

As also shown in FIG. 11, the first supply line 91 is connected to at least one return line 11 by means of at least one first sub-supply line 101. The return line 11 opens at a return opening 18, as described above. The return opening 18 opens at the side of the housing 2 opposite the turbine impeller 3, as described above. Unlike the first embodiment described above, the drive fluid cannot flow from the first supply line 91 to the turbine impeller 3 via a drive line 12 when the drilling turbine 1 is in operation.

Figure 12:
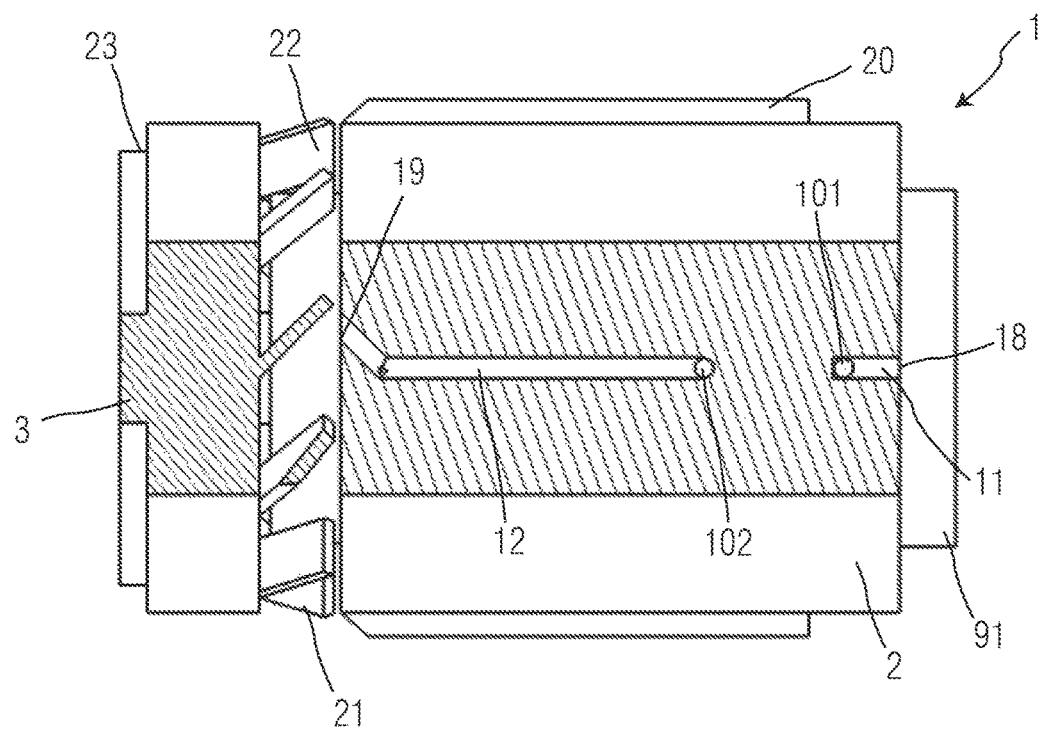
FIG. 12 shows a second section along sectional lines F-F in FIG. 10, of the drilling turbine according to the second exemplary embodiment.

Furthermore, it can be seen from FIG. 11 and FIG. 12 that the second supply line 92 is connected to at least one drive line 12 by means of at least one second sub-supply line 102. The drive line 12 is designed to direct the drive fluid at a predeterminable angle via at least one drive mouth 19 onto the baffle surfaces 22 of the baffle elements 21 of the turbine impeller 3, as a result of which the turbine impeller 3 including the milling head 4 is driven or set in rotation. Unlike in the first embodiment described above, however, the drive fluid cannot flow from the second supply line 92 via a return line 11 to a return opening 18 during the operation of the drilling turbine 1.

Since the drive fluid supplied to the first supply line 91 and the second supply line 92 can each be different in terms of type and/or quantity and/or pressure, these features of the second embodiment allow the drive torque or drive power of the drilling turbine 1 to be controlled independently of the feed force. As a result, the service life of the tool can be prolonged and/or the advance can be accelerated. Moreover, it is possible to adjust the drilling turbine 1 dynamically during operation to the rock encountered in each case. For this purpose, the drill hole cuttings discharged from the drill hole can be separated and analyzed in order to adjust the operating conditions.

Figure 9:
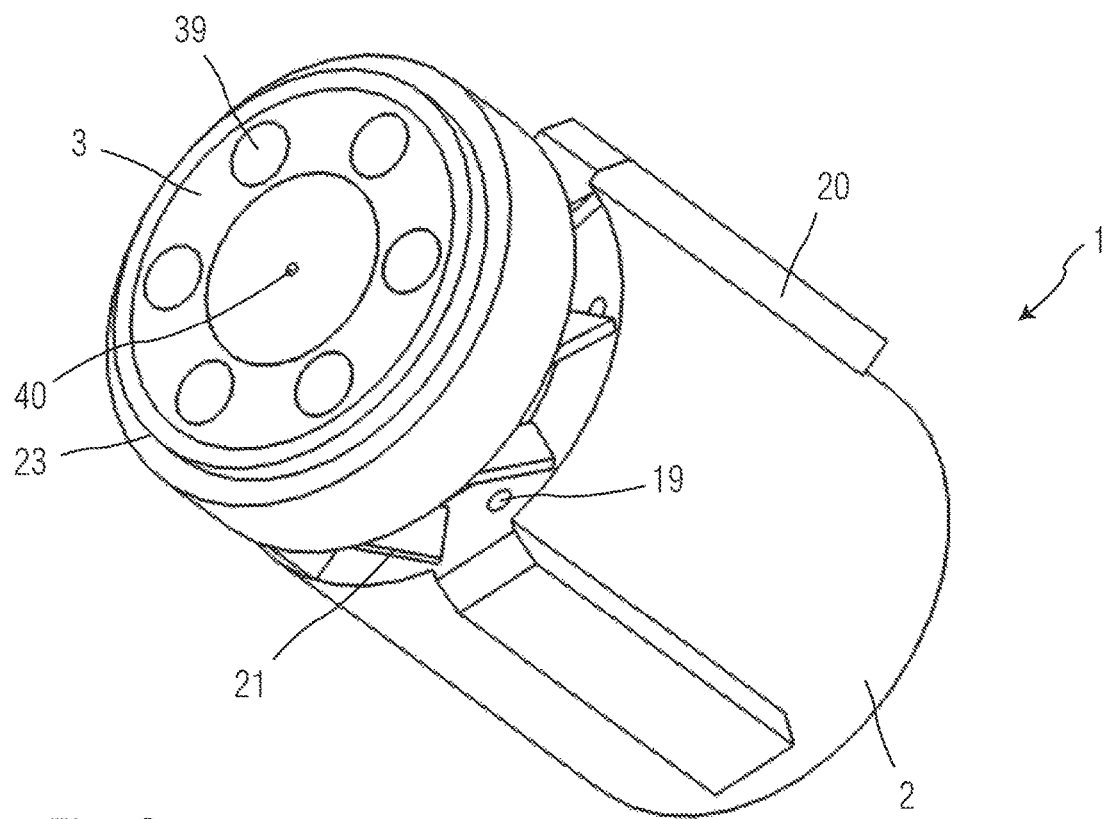
FIG. 9 shows a second view of a second exemplary embodiment of a drilling turbine according to the invention.

As shown in FIGS. 9 and 11, the turbine impeller 3 has six openings 390 in which at least one weight 39 can be received. In the illustrated exemplary embodiment, the openings 390 have a circular cross-section. In other embodiments of the invention, the openings 390 can also have a polygonal cross-section. In some embodiments of the invention, the number of openings can be between about 2 and about 16 or between about 4 and about 10. The invention does not teach the use of exactly six openings 390 as a solution principle. In yet another embodiment, at least one opening can be introduced as an annular groove into the turbine impeller 3.

The weights 39 can have a different size and/or be made of different materials which, for example, have different densities. In the application of the drilling turbine 1, the operator can be provided with an assortment of different weights from which the operator may select. The weights 39 can be secured in the openings 390 by press-fitting, inserting, bolting, gluing, and/or otherwise. In the same manner as described above for a turbine impeller 3, the milling head 4 and/or the drill bit 5 and/or the clamping tool 23 can also be provided with openings 390.

By selecting the weights 39, which are inserted into and secured in the respective openings 390, the rotating parts can be balanced so that the drilling turbine 1 exhibits smooth running. In other embodiments of the invention, different weights having different masses can be inserted into the openings so that the drilling turbine 1 exhibits imbalance. This feature has the effect that the center of the cutting edge of a drill bit 5 or a milling head 4, which is located on the axis of rotation, is not stationary in the radial direction of the drilling turbine. The center of the cutting edge of the drill bit 5 or the milling head 4 rather describes approximately a circular path in the material to be cut.

The cutting speed of a rotating cutting tool increases linearly with radius, i.e. at the center point of the cutting edge of a known drill bit 5 or milling head 4, the cutting speed is zero and the removal is accordingly low. This low removal limits the processing time for the entire drilling operation. Due to the imbalance of the drilling turbine 1 used according to the invention, the center point of the cutting edge of the drill bit 5 or of the milling head 4 describes approximately a circular path in the material to be cut. Each point of this circular path is traveled over in further machining phases by other partial surfaces of the drill bit 5 or the milling head 4 at a higher cutting speed so that the removal rate increases when considered over the entire cross-section of the drill hole, and the machining times can be reduced.

Of course, the invention is not limited to the illustrated embodiments. Therefore, the above description should not be regarded as restrictive but as explanatory. The following claims should be understood in such a way that an indicated feature is present in at least one embodiment of the invention. This does not exclude the presence of further features. Provided that the claims and the above description define "first" and "second" embodiments, this designation is used to distinguish between two similar embodiments without determining a ranking order.

What is claimed is:

1. A drilling turbine (1) having a longitudinal axis (X) and comprising:
    a housing (2) having a diameter of 2.5 cm to 15 cm and/or a length of 3 cm to 15 cm;
    a drive shaft (6) rotatably mounted in the housing, the drive shaft (6) being connectable to a drilling tool (4, 5); and
    a turbine impeller (3) located outside the housing (2) and designed to set the drive shaft (6) in rotation, the turbine impeller (3) being directly connected to the drive shaft (6), so that, during operation, the turbine impeller (3) and the drive shaft (6) and the drilling tool (4, 5) rotate at the same rotational speed;
    wherein:
    the housing (2) and drive shaft (6) both extend along the longitudinal axis (X) and the turbine impeller (3) is rotatable about the longitudinal axis (X);
    the turbine impeller (3) is openly arranged on the housing (2) such that it is not enclosed by the housing; and
    the housing has at least one drive line (9, 12) with at least one drive mouth (19), through which a drive fluid can be directed onto the turbine impeller (3) to rotate the turbine impeller (3) and the drive shaft (6).

2. The drilling turbine according to claim 1, wherein the turbine is designed as a constant pressure turbine.

3. The drilling turbine according to claim 1, wherein the housing (2) is provided with a plurality of guide skids (20).

4. The drilling turbine according to claim 3, wherein:
    the plurality of guide skids (20) comprises between 3 and 8 guide skids (20), and/or
    outer surfaces of the guide skids (20) lie on an envelope, the diameter of which corresponds to the diameter of the drilling tool (4, 5).

5. The drilling turbine according to claim 1, wherein the housing (2) has a single supply line (9), which is provided with a hose connection (8).

6. The drilling turbine according to claim 5, wherein the single supply line (9) in the housing (2) is divided into a plurality of sub-supply lines (10).

7. The drilling turbine according to claim 6, wherein:
    each of the sub-supply lines (10, 102) is connected to at least one drive line (12), and/or
    each of the sub-supply lines (10) is connected to at least one return line (11).

8. The drilling turbine according to claim 7, wherein the return line (11) opens at least one return opening (18), which is arranged at the end of the housing (2) opposite the drilling tool (4, 5).

9. The drilling turbine according to claim 1, wherein the housing (2) has at least one first supply line (91) and at least one second supply line (92), the first and second supply lines being concentric with respect to each other.

10. The drilling turbine according to claim 9, wherein the second supply line (92) in the housing (2) is divided into a plurality of second sub-supply lines (102), each of which connects to a corresponding one of the least one drive line (12).

11. The drilling turbine according to claim 9, wherein the first supply line (91) is connected to at least one return line (11) via at least one first sub-supply channel (101).

12. The drilling turbine according to claim 1, wherein:
the drive line (12) has at least one longitudinal portion (125), which extends at an angle of 20° to 70° with respect to the longitudinal axis of the drilling turbine (1), or
the turbine impeller (3) has a plurality of baffle elements (21), each of which has a baffle surface (22), and the drive line (12) has at least one longitudinal portion (125), which runs approximately parallel to a normal vector of the baffle surface (22).

13. The drilling turbine according to claim 1, wherein:
the housing (2) has at least one mounting chamber (16), which contains at least one ball bearing (37) for the drive shaft (6); and/or
the housing (2) has at least one mounting chamber (16) and at least one connecting line (13) which opens into the mounting chamber (16) from a supply line (9).

14. The drilling turbine according to claim 1, wherein at least one of the turbine impeller (3), the drilling tool (4, 5) and a clamping tool (23) configured to receive the drilling tool (4, 5), has an imbalance.

15. The drilling turbine according to claim 14, wherein the turbine impeller (3) and/or the clamping tool (23) has at least one opening (390), in which at least one weight (39) can be received.

16. The drilling turbine according to claim 15, wherein the weight (39) has a mass of 15 g to 50 g.

17. The drilling turbine according to claim 1, wherein:
the housing (2) has a diameter of 2.5 cm to 4.5 cm, and/or
the housing (2) has a length of 4 cm to 6 cm.

18. The drilling turbine according to claim 1, wherein the turbine impeller (3) comprises a plurality of inclined baffles elements (21) each having a baffle surface (22), the baffle elements (21) providing a constant pressure blading of the turbine impeller (3).

19. A drilling turbine (1) comprising:
a housing (2) having a diameter of 2.5 cm to 15 cm and/or a length of 3 cm to 15 cm;
a drive shaft (6) rotatably mounted in the housing, the drive shaft (6) being connectable to a drilling tool (4, 5); and
a turbine impeller (3) located outside the housing (2) and designed to set the drive shaft (6) in rotation, the turbine impeller (3) being directly connected to the drive shaft (6), so that, during operation, the turbine impeller (3) and the drive shaft (6) and the drilling tool (4, 5) rotate at the same rotational speed;
wherein:
the turbine impeller (3) is openly arranged on the housing (2) such that it is not enclosed by the housing;
the housing has at least one drive line (9, 12) with at least one drive mouth (19), through which a drive fluid can be directed onto the turbine impeller (3) to rotate the turbine impeller (3) and the drive shaft (6); and the drive shaft (6) has at least one hollow drill hole (25), which is connected to at least one flushing opening (24), through which a fluid can be guided to an end face of the drilling tool (4, 5).

20. A method for directional drilling, comprising:
providing the drilling turbine (1) of claim 1;
providing a deflection shoe (29) having a first hole (31) and a second hole (32) and a deflection passage (30) connecting the first and second holes (31, 32);
lowering the deflection shoe into a drill hole casing (33);
inserting the drilling turbine (1) into the first hole (31) of the deflection shoe (29) so that the drilling turbine (1) emerges from the second hole (32);
supplying a drive fluid via the at least one drive line (9, 12), so that the drive fluid emerges via at least one drive mouth (19) and is directed onto the turbine rotor (3), thereby causing the turbine impeller (3), the drive shaft (6) and the drilling tool (4, 5) to rotate at the same rotational speed.

21. The method according to claim 20, comprising:
supplying the drive fluid at a pressure of 100 bar to 200 bar; and/or
supplying the drive fluid at flow rate of 110 l/min to 300 l/min.

22. The method according to claim 20, wherein:
at least a part of the drive fluid exits on a side of the drilling turbine (1) facing away from the drilling tool (4, 5), and/or
part of the drive fluid lubricates and/or cools the drilling tool (4, 5).

23. The method according to claim 22, wherein:
the drive fluid is supplied via a supply line which has an inner line and an outer line surrounding the inner line;
the fluid supplied in the inner line exits the drilling turbine (1) via the at least one drive line (12) and the at least one drive mouth (19) and drives the turbine impeller (3), and
the fluid supplied in the outer line exits on the side of the drilling turbine (1) facing away from the drilling tool (4, 5).

24. The method according to claim 20, wherein:
the drive shaft (6) and the drilling tool (4, 5) rotate at a rotational speed of 15,000 min$^{-1}$ to 35,000 min$^{-1}$; and/or
a torque of 1.5 Nm to 2.5 Nm is generated at the drive shaft (6) and the drilling tool (4, 5).

25. The method according to claim 20, wherein the drive fluid is supplied via a supply line having a first longitudinal portion with a first diameter and a second longitudinal portion with a second diameter, the first diameter being larger than the second diameter.

26. The method according to claim 20, comprising:
collecting drive fluid exiting the drilling turbine;
cleaning the collected drive fluid of drill hole cuttings and impurities; and
supplying the cleaned drive fluid back to the drilling turbine via a pump.

27. The method according to claim 20, wherein the first hole (31) and the second hole (32) of the deflection shoe (29) are connected by the deflection passage (30) at an angle between 25° and 45°.

28. Method according to claim 20, wherein at least one of the turbine impeller (3), the drilling tool (4, 5) and a clamping tool (23) configured to receive the drilling tool (4, 5), has an imbalance.

29. The method according to claim 20, further comprising:
   drilling in a sideways direction so as to penetrate a wall of the drill hole casing (33) and the earth layer (35) outside the drill hole casing (33).

30. A method for directional drilling, comprising;
   providing a drilling turbine (1) having a longitudinal axis (X), the drilling turbine comprising:
      a housing (2), in which a drive shaft (6) is rotatably mounted, and
      a turbine impeller (3), located outside the housing and designed to set the drive shaft (6) in rotation, the drive shaft (6) being connected to a drilling tool (4, 5); wherein:
      the housing (2) and drive shaft (6) both extend along the longitudinal axis (X) and the turbine impeller (3) is rotatable about the longitudinal axis (X);
   providing a deflection shoe (29) having a first hole (31) and a second hole (32) and a deflection passage (30) connecting the holes (31, 32);
   lowering the deflection shoe into a drill hole casing (33);
   inserting the drilling turbine (1) into the first hole (31) of the deflection shoe (29) so that it emerges from the second hole (32);
   supplying a drive fluid via at least one drive line (9, 12), which emerges via at least one drive mouth (19) and is directed onto the turbine rotor (3), wherein
   the turbine impeller (3) and the drive shaft (6) and the drilling tool (4, 5) rotate at the same rotational speed.

31. The method according to claim 30, further comprising:
   drilling in a sideways direction so as to penetrate a wall of the drill hole casing (33) and the earth layer (35) outside the drill hole casing (33).

32. A drilling turbine (1) having a longitudinal axis (X), the drilling turbine comprising:
   a housing (2) having a diameter of 2.5 cm to 15 cm and/or a length of 3 cm to 15 cm; and
   a turbine impeller (3) located outside the housing (2) and openly arranged on the housing (2) such that it is not enclosed by the housing;
   wherein:
   the housing (2) extends along the longitudinal axis (X) and the turbine impeller (3) is rotatable about the longitudinal axis (X); and
   the housing has at least one drive line (9, 12) with at least one drive mouth (19), through which a drive fluid can be directed onto the turbine impeller (3) to rotate the turbine impeller (3) about the longitudinal axis (X).

33. The drilling turbine according to claim 32, wherein the turbine is designed as a constant pressure turbine.

34. The drilling turbine according to claim 32, wherein the turbine impeller (3) comprises a plurality of inclined baffles elements (21) each having a baffle surface (22), the baffle elements (21) providing a constant pressure blading of the turbine impeller (3).

* * * * *